Figure 1:
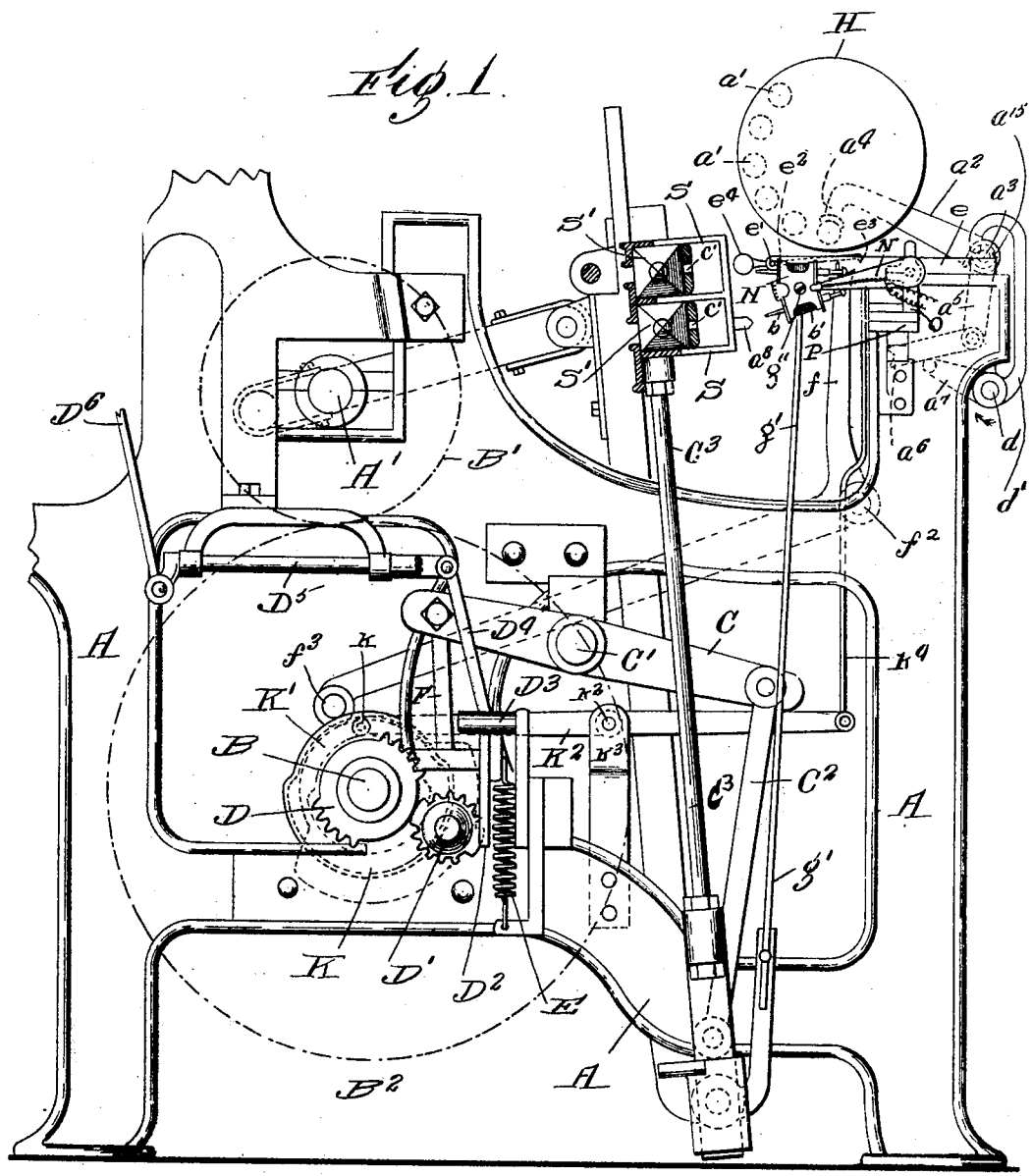

No. 808,966. PATENTED JAN. 2, 1906.
H. W. WYMAN, DEC'D.
M. H. WYMAN, ADMINISTRATRIX.
WEFT REPLENISHING LOOM.
APPLICATION FILED MAY 11, 1905.

2 SHEETS—SHEET 1.

Witnesses:
C. F. Wesson.
M. Haas.

Inventor:
H. W. Wyman
By Attorney
John L. Dewey

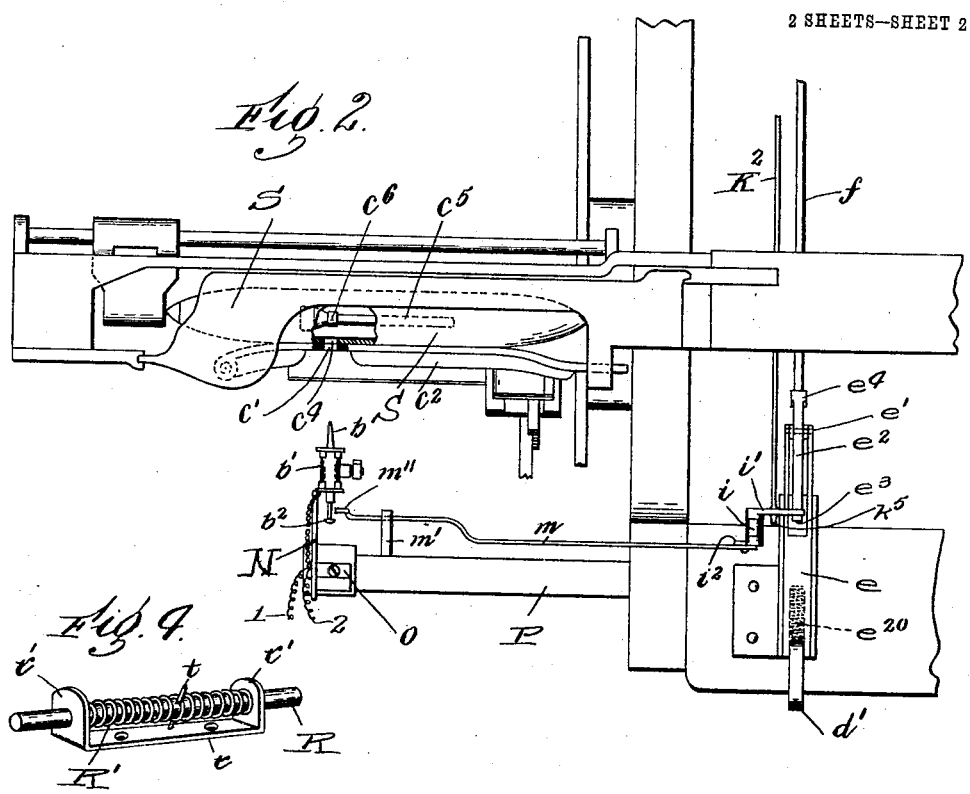
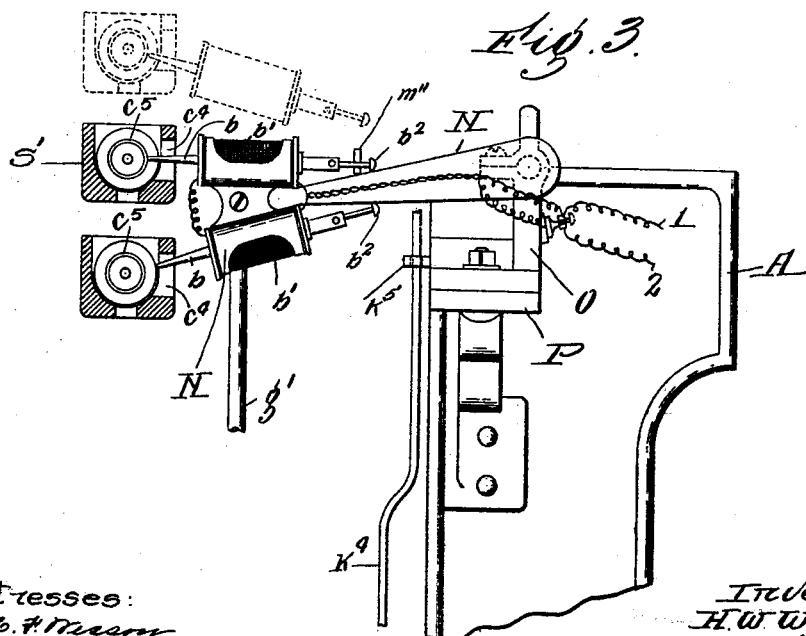

UNITED STATES PATENT OFFICE.

HORACE W. WYMAN, OF WORCESTER, MASSACHUSETTS; MARY H. WYMAN ADMINISTRATRIX OF SAID HORACE W. WYMAN, DECEASED.

WEFT-REPLENISHING LOOM.

No. 808,966.　　　　Specification of Letters Patent.　　　　Patented Jan. 2, 1906.

Application filed May 11, 1905. Serial No. 259,870.

*To all whom it may concern:*

Be it known that I, HORACE W. WYMAN, a citizen of the United States, residing at Worcester, in the county of Worcester and State of Massachusetts, have invented certain new and useful Improvements in Weft-Replenishing Looms, of which the following is a specification.

My invention relates to looms and to that class of looms having filling-supply mechanism and filling-detector mechanism to detect the substantial exhaustion of filling in the active shuttle and shifting or drop shuttle-boxes; and my invention particularly relates to improvements on the loom of the class referred to shown and described in my United States Letters Patent No. 665,845 of January 8, 1901. In said patented loom the filling detector or feeler mechanism adjacent the shifting or drop shuttle-boxes moves up and down with the shuttle-boxes in a substantially vertical plane, so that the filling detectors or feelers will always maintain proper relation to the shuttle-boxes and feel for and detect the practical exhaustion of filling in the active shuttle.

In my improvements as herein shown and described I provide a frame or support for the filling detectors or feelers adjacent the shifting or drop shuttle-boxes which has a pivotal motion to move the detectors or feelers vertically in the arc of a circle. As the shifting or drop shuttle-boxes move up or down, according to the indications of the pattern-surface, the frame or support for the detectors or feelers, which preferably is connected with the vertically-moving shuttle-box rod, will have a pivotal motion, and each detector or feeler will move uniformly with its coöperating shuttle-box with an angular movement, whereby a detector or feeler will contact with the bobbin, which is in the shuttle next to be thrown when the lay is in its forward position, without regard to whether the shuttle-boxes are to be shifted from one position to another or whether the boxes remain stationary for a number of picks, the bobbin in said shuttle being at the nearest point to the pivotal point of the pivoted frame. The other filling detectors or feelers being at a greater distance from their coöperating bobbins, due to the feelers moving in the arc of a circle and away from the straight vertical movement of the shuttle-boxes, will not contact with their bobbins, and therefore will be given no unnecessary movement.

In carrying out my improvements as herein shown and described I have provided a plurality of electromagnets carried on a pivoted frame and having magnetized cores or pins movable back and forth in the magnets. Said pins act as detectors or feelers, one for each shuttle-box.

In connection with the magnetized pins acting as detectors or feelers I have employed mechanism of substantially the same construction and operation as shown in my said Patent No. 665,845 for operating the filling-change mechanism to supply fresh filling in the usual and well-known way.

I have shown in the drawings my improvements applied to a loom of well-known construction and operation corresponding to the loom shown and described in my said patent, and as my present improvements relates only to the filling detector or feeler frame and the pivotal movement thereof to move the detectors or feelers vertically in the arc of a circle instead of in a straight line it will only be necessary to describe very briefly the other parts of the loom shown in the drawings.

The same characters of reference are used in the drawings as are used in my said patent for similar parts.

Referring to the drawings, Figure 1 is an end view of portions of a loom having my improvements thereon. The shuttle-boxes are shown in section. Fig. 2 is a plan view and partial section of the shuttle-box end portion shown in Fig. 1. Fig. 3 is, on an enlarged scale, a detached side view of the filling-detector mechanism; and Fig. 4 shows, on an enlarged scale, a modified construction of the filling detector or feeler detached.

The loom-frame A, crank-shaft A', cam-shaft B, gears B' B², connecting the crank and cam shafts, the main shuttle-box lever C, pivoted at C' and carrying at one end the connecting-rod C², connected to the shuttle-box rod C³ at its lower end, mutilated gear D on the cam-shaft B, mutilated gear D', having the movable teeth by which it is forced into and out of operative connection with the gear D through the arm D², stud D³, connecting rod D⁴, rock-shaft D⁵, and connector D⁶ to the pattern mechanism, (not shown,) the spring E and link F, connected to one end of the shuttle-box lever C, by which said lever is operated from the mutilated gear D' to raise and lower the shuttle-boxes according to the desired pattern, are and may be all of the ordinary and usual construction.

Mounted on the opposite end of the loom-frame is any usual form of construction of magazine or hopper H, carrying a series of filling-carriers $a'$, arranged in groups, each group containing filling-carriers having different-colored fillings, corresponding with the fillings used in the series of shuttles of the shifting shuttle-boxes, and the magazine-hopper is moved positively and in unison with each change of position of the shuttle-boxes to thus place and keep opposite the transferrer $a^2$ a filling-carrier having a filling corresponding in character or color with the filling in the active shuttle, all as fully shown and described in United States Letters Patent No. 600,053, to which reference may be made.

Suitably pivoted to the breast-beam at $a^3$ is a transferrer $a^2$, having its end $a^4$ disposed in relation to the filling-carriers $a'$, as shown in said United States Letters Patent No. 600,053, referred to. A spring $a^{15}$ normally holds the end of the transferrer above the lowest filling-carrier. Fixedly connected with the transferrer at its pivotal connection $a^3$ to the breast-beam is an arm $a^5$, having pivoted at its lower end the dagger $a^6$, which rests upon a lifter $a^7$, secured to the shaft $d$, running lengthwise of the breast-beam. From this construction it is evident that if the lifter $a^7$ should be raised by the turning of the shaft $d$ in the direction of the arrow it will raise the dagger $a^6$ and place its end in the path of the bunter $a^8$, secured in this instance to the lay, and which as the lay moves forward will, through the dagger $a^6$ and arm $a^5$, move the transferrer $a^2$ to cause it to transfer a filling-carrier $a'$ in the usual and well-known way.

At the opposite end of the loom from the magazine H are mounted the shifting or drop shuttle-boxes S, in this instance two in number. Each shuttle-box carries a shuttle S', containing a bobbin or filling-carrier $c^5$, having in this instance a metal or other band $c^6$, (see Fig. 2,) normally covered by the filling on the bobbin; but when said filling is exhausted to a predetermined amount, usually sufficient to make two or three picks, such band is exposed. In the side of each shuttle S' adjacent the band $c^6$ on the filling-carrier $c^5$ is formed a hole $c^4$, and in line therewith, when the shuttle is properly boxed, is a corresponding hole $c'$, formed in the wall $c^2$ of each shuttle-box, the wall $c^2$ being in this instance represented as the shuttle-binder.

When the shuttles S' are properly boxed in the drop shuttle-boxes S, the hole $c'$ $c^4$ and the band $c^6$ in the active shuttle will coincide in alinement, and they are so disposed with relation to the filling detectors or feelers, to be hereinafter described, that on each forward beat of the lay the filling detector or feeler in line with the active shuttle will enter said holes and feel for the filling on the carriers.

Secured to the shaft $d$, extending along the front part of the breast-beam in the usual way, is an arm $d'$, (see Fig. 1,) bearing at its upper end against the forward end of a slide $e$, which may be provided with a spring $e^{20}$, Fig. 2, to normally force it toward the lay, and has at its inner end, pivoted thereto at $e'$, an actuator $e^2$, the forward end of which has a down-turned hook $e^3$, Fig. 1, adapted to be engaged when depressed with the upper end of a hammer $f$, pivoted at $f^2$, and having a pin or roller $f^3$ thereon, which travels on the surface of a cam K, secured to the cam-shaft B. (See Fig. 1.)

The end $e^4$ of the actuator $e^2$ on the side of the pivot $e'$ opposite the hook $e^3$ is enlarged or weighted, which tends to normally hold the hook end $e^3$ of the actuator $e^2$ out of the path of movement of the upper end of the vibrating hammer $f$. Should the end $e^3$ of the actuator $e^2$ be forced into engagement with the upper end of the hammer $f$, the latter will move the actuator $e^2$ and the slide $e$ forward and also move the arm $d'$ to turn the shaft $d$ and lift the dagger $a^6$ in the path of the bunter $a^8$ and cause the filling-change mechanism to operate in the ordinary way.

In order to depress the hook $e^3$ of the actuator $e^2$ into the path of the vibrating hammer $f$, I provide in this instance on the breast-beam adjacent the slide $e$ the stand $i$ and pivot therein a depressor, preferably comprising a bell-crank lever one arm $i'$ of which projects over the hook end $e^3$ of the actuator $e^2$ and which when free to move will under the action of gravity overcome the weight of the end $e^4$ of the actuator $e^2$ and depress the end $e^3$ of the actuator $e^2$ to enable the vibrating hammer $f$ to engage and move the same and the slide $e$, as above described. To the other downwardly-extending arm $i^2$ of the bell-crank lever forming the depressor I connect a rod $m$, adapted to have a longitudinal movement in a suitable guide $m'$ (see Fig. 2) and which when free to move will move to the left, Fig. 2, through the downward movement of the arm $i'$ of the depressor above described. The outer end $m''$ of the detector-rod $m$ is enlarged or has an engaging surface thereon which is adapted to extend in the path of and be in abutting contact with the filling detector or feeler which is in line with the active shuttle, and if at such time the filling detector or feeler should indicate a practical exhaustion of filling in the active shuttle then the detector or feeler will be moved forwardly on the backward stroke of the lay to free the end $m''$ of the rod $m$ and permit the depressor $i'$ to lower the hook end $e^3$ of the actuator $e^2$ to cause the movement of the slide $e$ and a change of filling in the ordinary way. As the shuttle-boxes rise and fall between the strokes of the lay, it is evident that there are times when no one of the feelers is in line with the end of the detector-rod $m$, and at such times provisions are made through certain mechanism to prevent the arm $i'$ of the depressor from depressing the actuator $e^2$. I will now describe said mechanism.

Upon the cam-shaft B is fast a cam K', in the cam-groove of which travels a roller $k$, secured to one end of a lever K², pivoted at $k^2$ to a bracket $k^3$ and carrying at its opposite end a vertically-moving rod $k^4$, (termed the "depressor-controller,") which rod passes through a guide $k^5$, (see Fig. 3,) secured to the breast-beam. The upper end of the rod $k^4$ extends directly under the arm $i'$ of the depressor, and on the upward movement of said rod $k^4$ under the action of the cam K' the upper end of said rod $k^4$ will contact with and raise and support the said arm $i'$ and hold it out of contact with the hook end $e^3$ of the actuator $e^2$. The timing of the cam K' is such that as the shifting shuttle-boxes S and the filling detectors or feelers connected therewith rise and fall between the picks and are not in position to prevent endwise movement of the detector-rod $m$ the rod $k^4$ will be raised to support the arm $i'$ of the depressor out of contact with the hook end $e^3$ of the actuator $e^2$ and with the engaging end $m''$ out of the plane of movement of the filling detectors or feelers $b$. When the shifting shuttle-box stops with a shuttle on a line with the race and its filling detector or feeler $b$ is in position to be engaged by the end $m''$ of the detector-rod $m$, then the rod $k$ is lowered, through the rotation of the cam K', to release the arm $i'$ and allow it to rest on the hook end $e^3$ of the actuator $e^2$ and to allow the detector-rod $m$ to be moved outwardly and the end $m''$ thereof to contact with the feeler $b$ at its rear end to prevent further movement of the detector-rod $m$. If the practical exhaustion of filling is indicated at this time, the end $m''$ of the detector-rod $m$ will pass by the outer end of the feeler, which will move inwardly, and the parts will be operated in the usual way and as fully described in Patent No. 665,845, above referred to. After the parts have operated to supply fresh filling the engagement of the depressor-controller $k^4$ with the arm $i'$ to raise said arm will, through the movement of the bell-crank lever, of which said arm forms a part, return the detector-rod $m$ to its normal position.

All of the above parts correspond with the parts designated by similar letters in my said patent and form no part of my present improvements, but may be used in connection therewith.

I will now describe my present improvements, which, as above stated, relate simply to the filling detector or feeler mechanism to detect substantial exhaustion of filling in the active shuttle.

To the lower end of the shuttle-box rod C³ is attached the lower end of a rod $g'$. The upper end of the rod $g'$ is pivotally connected at $g''$ to the inner end of a filling detector or feeler carrying frame N, which at its outer end is pivotally mounted in this instance on a stand O, secured to a bracket P, extending out from the loom-frame. The filling detector or feeler carrying frame N has a pivotal motion in a vertical plane and has supported thereon in this instance two detectors or feelers $b$, one for each shuttle-box and each shuttle therein.

The feelers $b$, as shown in the drawings, correspond to the feelers $b$ of my said Patent No. 665,845 and consist in this instance of a balanced magnetic body or pin free to have a longitudinal movement in a suitable support, and in the form represented the body or pin $b$ consists of a piece of soft iron loosely supported in the center of a coil of wire $b'$, through which an electric current is adapted to pass by means of the wires 1 and 2, leading to the opposite poles of any suitable source of electric energy, forming thereby, in effect, a solenoid. Thus during the passage of an electric current through the wire coil the feeler $b$ will be held in the center of the coil in a balanced condition—that is, while the feeler will be free to yield longitudinally under a disturbing force it will be normally held as the core of a solenoid with its ends projecting beyond the ends of the wire coil and will be, in effect, a magnet. The end $b^2$ of the feeler is preferably enlarged to prevent the same from being drawn entirely from the wire coil on the engagement of the feeler with the band on the bobbin, all as fully described in my said Patent No. 665,845. The filling-feelers $b$ in addition to their longitudinal movement have a movement in the arc of a circle and are so placed relatively to the shuttles and shuttle-boxes that when the lay is in its forward position only the feeler which is in line with the active shuttle will enter the shuttle to detect substantial exhaustion of filling therein in the normal operation of the loom. The other feeler will remain substantially stationary, its projecting end simply entering the opening in the shuttle without engaging the filling sufficiently to be moved longitudinally thereby. (See Fig. 3.)

While I have shown and described my improvements in a pivoted filling detector or feeler carrying frame, combined with and used in connection with my improvements patented in Patent No. 665,845, referred to above, it will be understood that my improvements may be used in connection with other forms of filling-change mechanism of weft-replenishing looms, and my present improvements may be used in connection with my improvements shown and described in my United States Patent No. 687,470, in which a spring is used in connection with the filling detector or feeler.

I have shown and described my improvements in connection with two shifting or drop shuttle boxes; but they may equally well be used in connection with more than two shifting or drop shuttle boxes by adding an additional filling detector or feeler for each shuttle-box.

It will be understood that instead of forming the feelers $b$ as cores of solenoids I may use a magnetized body or feeler of the construction shown in my Patent No. 665,559. In Fig. 6 thereof and shown herein in Fig. 4, in which the magnetized body or feeler R is mounted and guided in ears $r'$ on a stand $r$, a spring R' surrounds said feelers between the ears $r'$ and a transverse pin $t$ in the feeler R acts to limit the extent of movement of the feeler R as it clings to the magnetic body on the bobbin, as fully described in said Patent No. 665,559. The stand $r$ will be attached to the pivoted frame N. If preferred, I may use any other suitable filling detector or feeler to detect substantial exhaustion of filling in the active shuttle, said detector or feeler having a movement in the arc of a circle in addition to its longitudinal movement.

I have not shown in the drawings or described any means for stopping the loom upon the breaking or entire exhaustion of filling, as the construction and operation of said means, comprising the filling detector or fork mechanism and intermediate connections to the knock-off lever, are well known and are always used on looms, as is well understood, and will be used on looms having my improvements thereon.

Having thus described my invention, what I claim as new, and desire to secure by Letters Patent, is—

1. In a loom, the combination with shifting or drop shuttle-boxes, of a plurality of filling-detector feelers, adapted to enter the shuttles, and having a longitudinal movement and also a movement in the arc of a circle.

2. In a loom, a plurality of filling-detector feelers, to detect substantial exhaustion of filling in the shuttles, said feelers moving in the arc of a circle in a vertical plane.

3. In a loom, the combination with a frame or support having a pivotal movement in a vertical plane, of a plurality of electromagnets carried on said frame or support.

4. In a loom, shifting or drop shuttle-boxes, a frame pivotally supported and carrying a plurality of filling-detector feelers, connections intermediate said frame and the shuttle-boxes, to communicate a pivotal movement to said frame at each movement of the shuttle-boxes, and cause the feelers to move in the arc of a circle so that only the feeler in line with the active shuttle will be in position to detect substantial exhaustion of filling.

5. In a loom, shifting shuttle-boxes, a frame pivotally supported and carrying a plurality of filling-detector feelers, connections intermediate said frame and the shuttle-boxes, to communicate a pivotal movement to said frame at each movement of the shuttle-boxes, and cause the feelers to move in the arc of a circle, a detector-rod, and connections intermediate said rod and the bunter of the filling-change mechanism, to cause said mechanism to operate when said detector-rod moves past the end of a feeler and said bunter.

6. In a loom, the combination with shifting shuttle-boxes, of a plurality of filling-detector feelers, one for each shuttle-box, and means for supporting said feelers, and for moving them with an angular or pivotal motion uniformly with the movement of the shuttle-boxes.

7. In a loom, the combination with shifting shuttle-boxes, and means to move them, of a plurality of electromagnets having movable cores or feelers, a pivotal or angular movable frame carrying said magnets, and means to move said frame to cause said feelers to have an angular or pivotal movement in a vertical plane.

8. In a loom, a plurality of movable filling-detector feelers, and means for supporting the same to cause the detecting ends of said feelers to move with an angular movement.

9. In a loom, a lay, a series of shuttle-boxes movable vertically on said lay and carrying bobbins, a plurality of filling-detector feelers moved in the arc of a circle on a pivoted frame, and said frame having a pivotal motion whereby a feeler will contact only with the bobbin in the active shuttle to detect substantial exhaustion of filling, when the lay is moved to its forward position.

HORACE W. WYMAN.

Witnesses:
J. C. Dewey,
M. Haas.